United States Patent
Yerubandi et al.

(10) Patent No.: US 12,497,961 B2
(45) Date of Patent: Dec. 16, 2025

(54) METHOD FOR SIMULATING THE EFFECT OF PLUGS ON CEMENT PLACEMENT

(71) Applicant: Halliburton Energy Services, Inc., Houston, TX (US)

(72) Inventors: Kvvn Krishna Babu Yerubandi, Houston, TX (US); Anoop Sheshrao Jogdand, Pune (IN); Walmy Cuello Jimenez, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 323 days.

(21) Appl. No.: 18/086,250

(22) Filed: Dec. 21, 2022

(65) Prior Publication Data
US 2024/0209849 A1    Jun. 27, 2024

(51) Int. Cl.
*F04B 49/06*    (2006.01)
*E21B 21/01*    (2006.01)
(Continued)

(52) U.S. Cl.
CPC .......... *F04B 49/065* (2013.01); *E21B 21/01* (2013.01); *E21B 33/16* (2013.01);
(Continued)

(58) Field of Classification Search
CPC ............ F04B 49/065; F04B 2205/14; F04B 2207/02; F04B 2207/03; E21B 21/01;
(Continued)

(56) References Cited

U.S. PATENT DOCUMENTS

| | | | |
|---|---|---|---|
| 4,984,633 A | 1/1991 | Langer et al. | |
| 6,666,267 B1 | 12/2003 | Charlton | |

(Continued)

FOREIGN PATENT DOCUMENTS

| | | | |
|---|---|---|---|
| CN | 110905440 A | 3/2020 | |
| EP | 1585040 A1 | 12/2005 | |
| WO | WO-2009142873 A1 * | 11/2009 | ............. E21B 43/00 |

OTHER PUBLICATIONS

Foreign Communication from Related Application—International Search Report and Written Opinion of the International Searching Authority, International Application No. PCT/US2024/021582, dated Jul. 15, 2024, 13 pages.

(Continued)

*Primary Examiner* — Chad G Erdman
(74) *Attorney, Agent, or Firm* — Conley Rose, P.C.; Rodney B. Carroll

(57) ABSTRACT

A wellbore servicing method comprising transporting a pump unit comprising a unit controller and pumping equipment to a wellsite. Executing a design process on the unit controller to determine a concentration of a wellbore treatment fluid at a wiper plug within an oilfield tubular. The design process utilizes a CFD model to generate a static mesh representative of the geometry of the oilfield tubular, locate the wiper plug within the static mesh, and determine a fluid velocity on each side of the wiper plug with flexible static mesh cells. The CFD model can generate a prediction of the concentration of the wellbore treatment fluids in response to the wiper plug reaching a target location within the oilfield tubular.

22 Claims, 5 Drawing Sheets

(51) Int. Cl.
  *E21B 33/16* (2006.01)
  *E21B 43/26* (2006.01)
  *G05B 17/02* (2006.01)
  *G06F 30/28* (2020.01)

(52) U.S. Cl.
  CPC .......... *E21B 43/2607* (2020.05); *G05B 17/02* (2013.01); *G06F 30/28* (2020.01); *E21B 2200/20* (2020.05); *F04B 2205/14* (2013.01); *F04B 2207/02* (2013.01); *F04B 2207/03* (2013.01)

(58) Field of Classification Search
  CPC .. E21B 33/16; E21B 43/2607; E21B 2200/20; G05B 17/02; G06F 30/28
  See application file for complete search history.

(56) References Cited

U.S. PATENT DOCUMENTS

| | | | |
|---|---|---|---|
| 7,590,515 | B2 | 9/2009 | Richards et al. |
| 7,899,654 | B2 | 3/2011 | Zhang et al. |
| 9,208,269 | B2 * | 12/2015 | Liang ............ G06F 30/20 |
| 2011/0198090 | A1 | 8/2011 | Buytaert et al. |
| 2015/0047907 | A1 | 2/2015 | Buytaert et al. |
| 2021/0131234 | A1 | 5/2021 | Lopes Pereira et al. |
| 2021/0238946 | A1 * | 8/2021 | Vargo, Jr. ............ E21B 47/07 |
| 2023/0167731 | A1 | 6/2023 | Yerubandi et al. |

OTHER PUBLICATIONS

S.T. Saleh et al., Field Evaluation of Key Liner Cementing Variables on Cement Bonding, Society of Petroleum Engineers, 27883. Mar. 23-25, 1994. pp. 1-12. Long Beach, California.

M.R. Wells et al., Analysis of Cementing Turbulators, Society of Petroleum Engineers, Drilling Engineering, Oct. 8-11, 1989. pp. 9-15. San Antonio, TX.

A.K. Gupta et al. , Swirl Flows, Energy and Engineering Science Series, pp. 1-152, Abacus Press 1984.

Filing Receipt, Specification and Drawings for U.S. Appl. No. 18/598,517, entitled "Method to Simulate Effect of Turbulator-Centralizer Ondisplacement of Wellbore Fluids While Cementing," filed Mar. 7, 2024, 73 pages.

Filing Receipt, Specification and Drawings for U.S. Appl. No. 63/541,492, entitled "Method to Simulate Effect of Turbulator-Centralizer on Displacement of Wellbore Fluids While Cementing," filed Sep. 29, 2023, 73 pages.

Bu, Yuhuan et al., Determination of Optimal Density Difference for Improving Cement Displacement Efficiency in eviated Wells, Journal of Natural Gas Science and Engineering, 2016, pp. 119-128.

Shadravan, Arash et al., Rheological Hierarchy Optimization Improves Fluid Displacement and Well Integrity, 3 Worldwide Case Studies, In: SPE Annual Technical Conference and Exhibition, Society of Petroleum Engineers, 2016, pp. 1-16.

Nguyen, D. et al., A Computational Algorithm for Calculating Displacement Efficiency in Horizontal Annuli—Eccentric Case, Chemical Engineering Communications, 2002, pp. 1-16.

Sun, Jinfei et al., Numerical Modeling of Motion of Displacement Interface in Eccentric Annulus During Primary Cementing, Energy Science & Engineering, 2020, pp. 1-14, inner pp. 1579-1591.

Foreign Communication from Related Application—International Search Report and Written Opinion of the International Searching Authority, International Application No. PCT/US2022/041462, dated Dec. 8, 2022, 3 pages pages.

Pelipenko, S.; Frigaard, I. A. (2004). Visco-plastic fluid displacements in near-vertical narrow eccentric annuli: prediction of travelling-wave solutions and interfacial instability. Journal of Fluid Mechanics, 520, pp. 343-377.

Frigaard et al., Effective and Ineffective Strategies for Mud Removal and Cement Slurry Design. Society of Petroleum Engineers SPE Latin American and Caribbean Petroleum Engineering Conference, Apr. 27, 2003 Port--0f-Spain, Trinidad and Tobago.

Brady S.D .et al., Recent Technological Advances Help Solve Cement Placement Problems in the Gulf of Mexico. Society of Petroleum Engineers SPE/IADC Drilling Conference, Feb. 18, 1992, New Orleans, Louisiana.

Ahmedi Tehrani et al., Laminar Displacement in Annuli: A Combined Experimental and Theoretical Study, Society of Petroleum Engineers SPE 24569 Oct. 4-7, 1992, Washington, D.C.

J. E. Griffith et al., Reverse Circulation of Cement on Primary Jobs Increases Cement col. Height Across Weak Formations. Society of Petroleum Engineers SPE 25440, Mar. 21-23, 1993, Production Operations Symposium Oklahoma City, OK.

Ali Etrati et al., Two-layer Displacement Flow of Miscible Fluids With Viscosity Ratio: Experiments, Physics of Fluids 30, 052103 (2018).

* cited by examiner

METHOD FOR SIMULATING THE EFFECT OF PLUGS ON CEMENT PLACEMENT

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

In the construction of oil and gas wells, a wellbore is drilled into one or more subterranean formations or zones containing oil and/or gas to be produced. In most instances, after the wellbore is drilled, the drill string is removed and a casing string is run into the wellbore. The annular space between the wellbore wall and a casing string, generally referred to as casing, can be filled with cement to isolate pressure within the wellbore from pressure within the formation. The process filling the annulus with cement can be referred to as "cementing" the wellbore. In some scenarios, cement can be pumped into the casing followed by a spacer fluid. In a second scenario, a plug can be utilized to separate the cement and wellbore fluids. In a third scenario, cement can be pumped into the wellbore between two plugs. A lower plug can be inserted into the casing string and cement pumped into the casing. An upper plug can be inserted into the casing string after the desired amount of cement has been injected. In all three scenarios, the volume of cement can be forced downhole by injecting displacement fluid into the casing string. The quality of the cement slurry can be degraded by the intermixing of the cement slurry with wellbore fluids and/or spacer fluids. Any loss of quality of the cement may require a remedial operation to repair. A method of determining the intermixing of cement and wellbore fluids without a plug or with at least one plug is desirable.

DETAILED DESCRIPTION OF THE INVENTION

Figure 1:
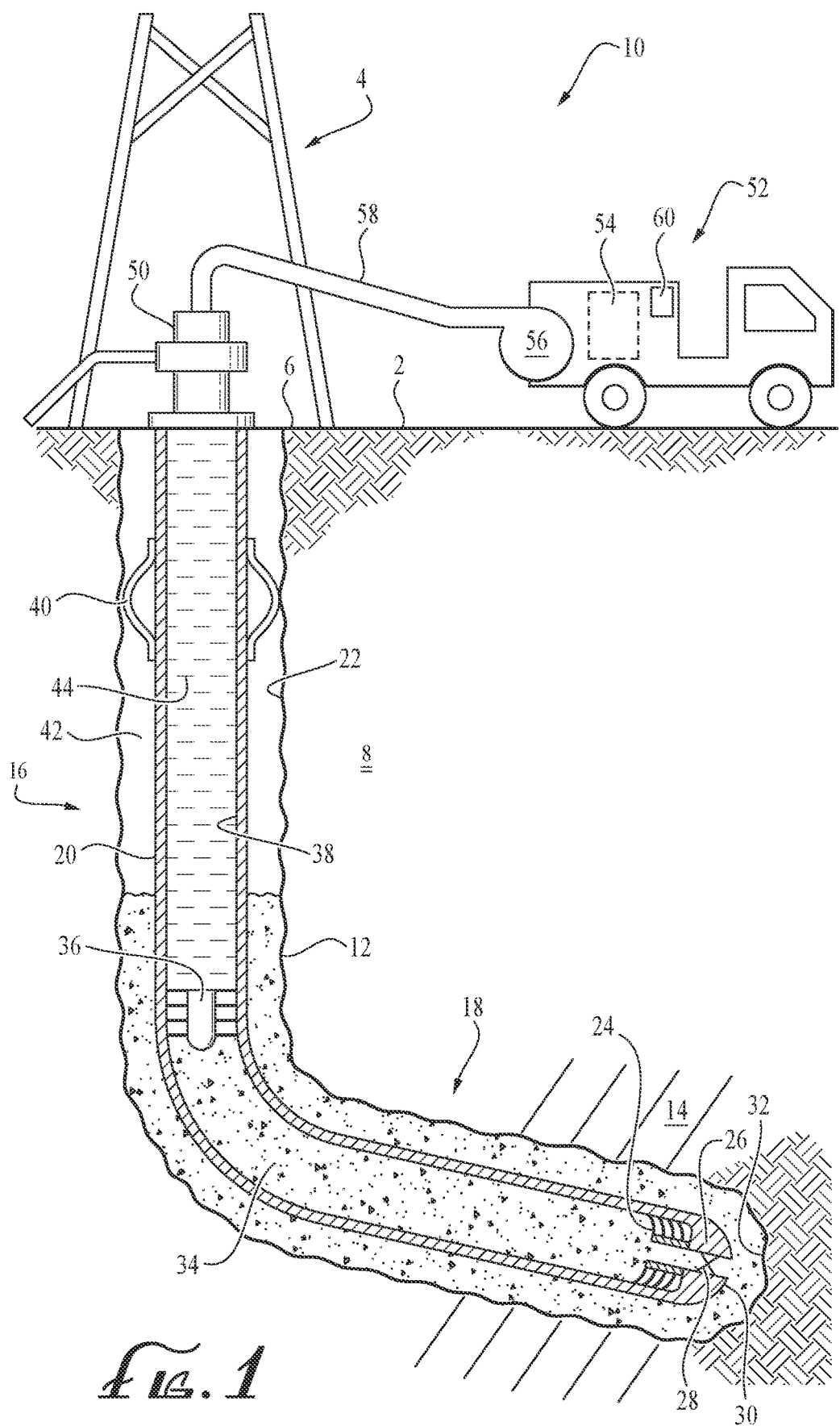
FIG. 1 shows a schematic view of an embodiment of the cementing operational environment.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Typically, the design of an oil well comprises at least two strings of casing cemented into place to secure the wellhead and provide zonal isolation. A first string of casing can be a relatively short string (referred to as surface casing) to secure the wellhead and to prevent loss of drilling fluids to surface aquafers. A second string of casing can be a longer string (referred to as production casing) that penetrates the formation and provides an isolation barrier to prevent formation fluids from contacting the casing. Although only two casing strings are described, an oil and gas well can comprise 3, 4, 5, or any number of casing strings.

A successful cementing operation begins with a design of the cementing operation that comprises a cement slurry, a pumping procedure, and various downhole tools, e.g., float shoe. The cementitious slurry generally comprises a blend of cement material (typically Portland cement), a liquid (typically water), and various chemicals to tailor the cement slurry for the downhole environment and/or the pumping operation. For example, a retarder or accelerator can be added to the cement slurry to slow down or speed up the curing process. A pumping procedure can be a set of instructions to mix and deliver a fluid treatment, e.g., cement slurry, into a wellbore. The pumping procedure can include time based or volume based intervals comprising pumping pressures, pumping flowrates, pump volumes, cement blends, and chemical additives to pump a cement slurry into the wellbore via a set of pumping equipment. The cementing operation may utilize various specialized downhole equipment such as wipers, darts, float shoes, and casing centralizers to enhance the quality of the cement bond. For example, the cement slurry can be separated from the drilling fluids and spacer fluids by a pump down cementing plug, e.g., upper plug, lower plug, wiper dart, wiper balls, or various other types of pump down articles.

In some wells, the design of a cementing operation may comprise pumping a spacer fluid and a cement slurry. For example, surface casing can comprise a relatively short string of casing that anchors a wellhead at the surface. This short string of casing can be successfully cemented by pumping a spacer fluid in front of the cement slurry. The spacer fluid and cement slurry may experience a relatively small amount of mixing with the drill fluid, e.g., drilling mud, in the wellbore. The design of the pumping operation for the surface casing can estimate the amount of mixing to determine the cement blend and pumping procedure to produce the desired cement strength and cement bond.

A cementing operation performed in the long string of production casing may comprise one or more cementing wiper plugs, also referred to as a wiper plug. Although a string of production casing can be successfully isolated with only a spacer fluid and cement, the mixing of drilling mud with the cement can degrade the quality of the cement bond strength. The design of the cementing operation can utilize a cementing displacement simulator to quantify the amount of fluid mixing. It can be a challenge to model the movement of the wiper plug in the casing, along with the movement of the wellbore fluids, due to the numerical complexities involved in modeling a solid boundary moving in concert with the fluids. The cementing displacement simulator can utilize a computational fluid dynamics (CFD) model with a static mesh for simulating fluid flow and fluid mixing. A solid moving object, e.g., a wiper plug, can require the CFD model to utilize a moving mesh with a much finer mesh. The computational power required for the CFD model with the moving mesh may only be practical in a laboratory environment. A cement displacement simulator for use by the service personnel in the office or on a wellsite location is needed. A method of simulating a wiper plug on a computing device with standard or ordinary processing power is desirable.

In order to track the movement of the plug through the casing, one solution can be provided by using expanding and shrinking the static cells of the CFD model as the wiper plug moves through the mesh cells. The cementing displacement simulator can then utilize relatively large mesh cells in comparison to the size of the wiper plug. For example, a wiper plug can be 1 foot in length and the static cell length can be 100 ft. The simulator can determine a cell number that the wiper plug is entering based on the pumping procedure and a time value or a pumped volume value. The simulator can divide the static cell that the plug enters (referred to as the transport cell) into two portions, for example, a first portion and a second portion. The first portion of the transport cell can begin at zero length when the plug enters the cell and expand from zero to 100 ft. The second portion of the transport cell can begin at a length of 100 ft and shrink or compress from 100 ft to zero. The simulator can determine the fluid movement before and after the wiper plug, e.g., the physical barrier, based on the solution of momentum equations. The progress of the wiper plug through the static cell can be determined by the pumping procedure and a volume of fluid pumped by the pumping equipment.

A second solution can be provided by combining the static mesh cells directly in front of the wiper plugs. For example, the second portion of a transport cell can begin at 200 ft and reduce in length to 100 ft when the wiper plug crosses the threshold to the next cell. The adjacent cell becomes the transport cell when the wiper plug crosses the threshold or boundary. The first portion of the transport cell begins at zero length and increases in length to 100 ft. The second portion of the transport cell begins at 200 ft and reduces in length to 100 ft. Combining the second portion of the transport cell with the adjacent cell can reduce the computational demands on the processor while modeling the movement of the wiper plug.

Turning now to FIG. 1, an embodiment of a cementing operating environment is illustrated. The cementing operating environment 10 comprises a servicing rig 4 that extends over and around a wellbore 12 that penetrates a subterranean formation 14 for the purpose of recovering hydrocarbons. A casing string 20 can be conveyed into the wellbore 12 by the servicing rig 4 or any other type of drilling rig such as a workover rig, an offshore rig, or similar structure. A wellhead 50 may be coupled to the casing string 20 at surface 2. A pump unit 52, located offshore or on land, can be fluidically coupled to a wellhead 50 by a supply line 58. The wellbore 12 can extend in a substantially vertical direction away from the earth's surface 2 and can be generally cylindrical in shape with an inner bore 22. At some point in the wellbore 12, the vertical portion 16 of the wellbore 12 can transition into a substantially horizontal portion 18. The wellbore 12 can be drilled through the subterranean formation 8 to a hydrocarbon bearing formation 14. Perforations made during the completion process that penetrate the casing 20 and subterranean formation 14 can enable the fluid in the subterranean formation 14 to enter the casing 20.

In some embodiments, a cementing operation can include a pump unit, a cement blend, a pumping procedure, and a variety of chemicals. The pump unit 52, also called a cementing unit, comprises a mixing system 54, a pumping mechanism 56, and a unit controller 60. The unit controller 60 may be a computer system suitable for communication with the service personnel and control of the mixing system 54 and the pumping mechanism 56. The mixing system 54 can mix the cement blend with a liquid, e.g., water, to form a cement slurry 34. The pumping mechanism 56 can deliver the cement slurry 34 from the mixing system 54 to the wellbore 12 via the supply line 58.

In some embodiments, the wellbore 12 can be completed with a cementing process that follows a cementing pumping procedure to place a cement slurry 34 between the casing string 20 and the wellbore 12. The wellhead 50 can be any type of pressure containment equipment connected to the top of the casing string 20, such as a surface tree, production tree, subsea tree, lubricator connector, blowout preventer, or combination thereof. The wellhead 50 can include one or more valves to direct the fluid flow from the wellbore and one or more sensors that measure pressure, temperature, and/or flowrate data. The pump unit 52 can follow a pumping procedure with multiple sequential steps to mix a cement blend with water to form a cement slurry 34 and place the cement slurry 34 into the annular space 42. The pumping procedure can include steps of pumping a spacer fluid to separate the drilling fluid, e.g., drilling mud, from the cement slurry 34. The pumping procedure can include instruction for downhole tools, for example, releasing and pumping a first cementing wiper plug 24, also called a lower plug, to physically separate the spacer fluid (or other wellbore fluids) from the cement slurry 34. The wiper plug 24 comprises a plurality of flexible fins, or wipers, that sealingly engage the inner surface 38 of the casing 20 with a sliding fit. The pump unit 52 can pump a predetermined volume of cement slurry 34 though the supply line 58, the wellhead 50, and into the casing string 20. A second cementing wiper plug 36, also called an upper plug, can be released from surface following the predetermined volume of cement slurry A volume of spacer fluid 44 or other type of completion fluid can be pumped after the cementing wiper plug 36 (the upper plug) to displace the cementing wiper plug 36 down the casing string 20. In some embodiments, the volume of cement slurry 34 located between the upper plug 36 and lower plug 24 can be pumped through the lower plug 24 after the lower plug 24 contacts the float shoe 26 and a shear disk or rupture disk is broken. The upper plug 36 can push the cement slurry 34 through the lower plug 24, out the float shoe 26 (or other suitable primary cementing equipment), and into the annular space 42 between the casing string 20 and the wellbore 12. In some embodiments, various downhole equipment can be included in the pumping procedure, for example, a plurality of centralizers 40 can be coupled to the casing string 20 to maintain the annular gap within the annular space 42 between the casing string 20 and the wellbore 12. In other embodiments, however, the casing string 20 may be omitted from all or a portion of the wellbore 12 and the principles of the present disclosure can equally apply to an "open-hole" environment. In still other embodiments, however, the primary cementing equipment, e.g., float shoe 26, at the end of the casing string 20 can be drilled out and a liner can be added to extend the length of the wellbore 12.

Figures 2A, 2B:
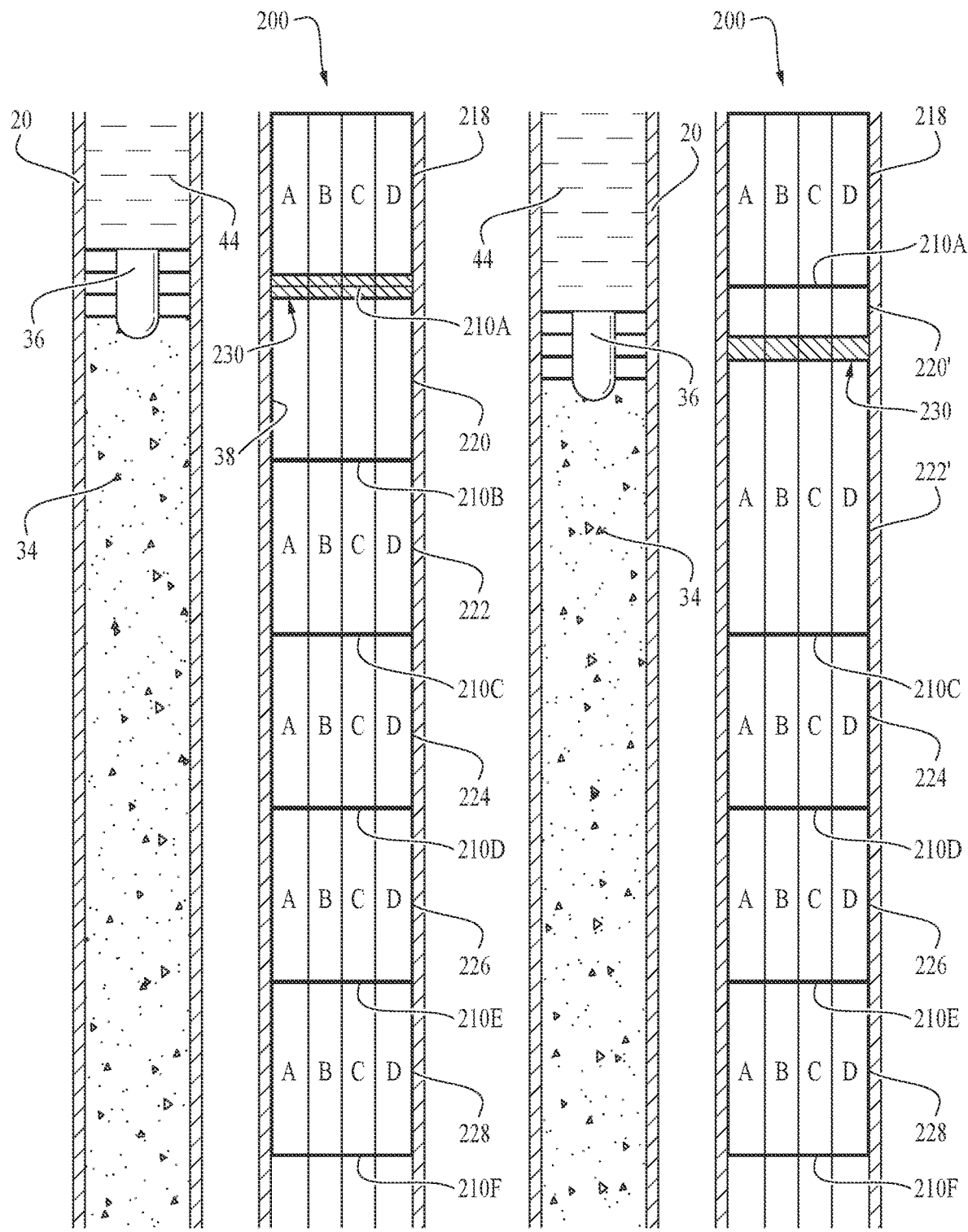
FIG. 2A shows a cross section of an embodiment of a fluid simulation.
FIG. 2B shows a cross section of another embodiment of the fluid simulation.

The pumping procedure of the cementing operation can be determined by a design process that utilizes a cementing displacement simulator, also referred to as a design simulator or the simulator. The design simulator can model the displacement of the cement slurry within the casing 20 with the lower plug 24, the upper plug 36, or both. The design simulator can utilize a static mesh to model the fluid flow within the casing 20. In some embodiments, the design simulator can model the travel of a cementing plug through the static mesh. Turning now to FIGS. 2A and 2B, an embodiment of a design process 200 of simulating a moving object within a static mesh is illustrated. The upper plug 36 is illustrated within the casing 20 separating the cement slurry 34 from the spacer fluid 44. The simulator can generate a static mesh based on the casing geometry, e.g., inside diameter and length. The static mesh comprises transport cells 218 and sub-cells A-D. The transport cells are shown in a consecutive order beginning with transport cell 218 and continuing with each adjacent cell sharing a boundary face 210. For example, transport cell 218 and transport cell 220 share boundary face 210A. Transport cell 220 and transport cell 222 share boundary face 210B. Transport cell 222 and transport cell 224 share boundary face 210C. Transport cell 224 and transport cell 226 share boundary face 210D. Transport cell 226 and transport cell 228 share boundary face 210E. The transport cells, e.g., transport cell 220, are bounded by the inner surface 38 of the casing 20, upper boundary face 210A, and lower boundary face 210B. Each transport cell, e.g., transport cell 220, can be static or fixed relative to the distance between the upper boundary face, e.g., face 210A, and the first upper boundary face located at the wellhead 50 and/or the surface 2. Although six transport cells are illustrated, it is understood that the design simulator can generate any number of transport cells, e.g., transport cell 220, beginning at the wellhead 50 and extending to the end of the casing 20, for example, ending at the float shoe 26. Although a length of 100 ft was described in an example, it is understood that the design simulator can set the transport cell length, e.g., the distance between the upper boundary face and the lower boundary face, to any length, for example, 10, 20, 30, 40, 50, 60, 70, 80, 90, 100, 110, 120, 130, 140, 150, 160, 170, 180, 190, 200 feet, or any length between 10 and 1000 ft.

In some embodiments, the design simulator can divide each transport cell into sub-cells. For example, as shown in FIGS. 2A and 2B, each transport cell, e.g., transport cell 220, can be divided into a sub-cell 220A, a sub-cell 220B, a sub-cell 220C, and a sub-cell 220D. The sub-cells can be static within each transport cell, as in, the location or order of the cells does not change. The design simulator can solve for the fluid transport within each sub-cell, e.g., sub-cell 220A, of each transport cell, e.g., transport cell 220. Although four sub-cells, e.g., sub-cell 220A-D, are illustrated, it is understood that the design simulator may create 1, 2, 3, 4, 5, 6, 7, 8, 9, 10, or any number of sub-cells.

In some embodiments, the design simulator can determine the wiper plug 36 location within the casing 20 by the pumping procedure, also referred to as the pump schedule, and the volume of fluid pumped by the pump unit 52. The design simulator can locate where the wiper plug 36 is located relative to the static mesh. For example, as shown in FIG. 2A, the design simulator can determine the wiper plug 36 is located at upper boundary face 210A between transport cells 218 and transport cell 220. The design simulator can represent the wiper plug 230 as a solid line, a rectangle, a square, or any other geometric shape and the wiper plug 230 can be an embodiment of the wiper plug 36, a lower cementing wiper plug, a dart, or any suitable device for separating a first wellbore fluid, e.g., cement slurry, from a second wellbore fluid, e.g., drilling fluid. The wiper plug 230 can enter a transport cell through a first boundary face, travel through the transport cell, and exit the transport cell through a second boundary face as the wiper plug 230 travels down the casing 20.

In some embodiments, the transport cell can be divided into two portions as the wiper plug 230 travels through the transport cell. For example, as illustrated in FIG. 2B, an upper portion of the transport cell 220 can become an upper transport cell fraction 220'. The design simulator can determine the size of the transport cell fraction 220' at a given moment in time (t) based on the pump schedule, volume of fluid pumped, and the pumping rate of the pump unit 52. For example, the transport cell fraction 220' may be zero when the wiper plug 230 is coincident with the upper boundary face 210A as shown in FIG. 2A. The transport cell fraction 220' may be positive and increasing in size, as shown in FIG. 2B, after the wiper plug 230 crosses the upper boundary face 210A. The design simulator can transform the transport cell fraction 220' into the transport cell 220 when the size of the transport cell fraction 220 is equal to the size of the transport cell 220. In some embodiments, the design simulator can transform the transport cell fraction 220' into the transport cell 220 when the wiper plug 230 reaches the location of the boundary face 210B.

In some embodiments, a second portion of the transport cell can become a lower transport cell fraction 222'. The lower transport cell fraction can initially expand in size to cover the area of two transport cells and decrease in size as the wiper plug 230 travels through. For example, as shown in FIG. 2B, the transport cell fraction 222' can increase to a distance from boundary face 210A to boundary face 210C or the area of two transport cells, e.g., transport cells 220 and 222. The transport cell fraction 222' can be decreasing in size until the size of the upper transport cell fraction 220' is equal to or greater than the transport cell 220. The design simulator can transform the transport cell fraction 222' into the transport cell 222.

In some embodiments, the design simulator can transform a lower transport cell fraction 222 into an upper transport cell fraction. For example, the lower transport cell fraction 222' can be decreasing in size until the design simulator transforms the upper transport cell fraction 220' into the transport cell 220 and transforms the lower transport cell fraction 222' into the upper transport cell fraction 222'. Initially, the upper transport cell fraction 222' may be zero, as in instantaneously upon transformation, until the wiper plug 230 passes the boundary face, e.g., boundary face 210B, thus the upper transport cell fraction 222' increases in size to greater than zero.

The design simulator can determine a velocity of the wiper plug 230 within the transport cell, e.g., transport cell 220, with the volume of fluid pumped and the pumping rate per the pump schedule. The design simulator can determine the motion and velocity of the wellbore fluids, e.g., cement slurry 34, within the upper transport cell and lower transport cell as a function of the velocity of the solid object, e.g., the wiper plug 230. For example, the design simulator can utilize the pump schedule, wellbore casing volume, appropriate sizes of the upper transport cell and lower transport cell in a CFD model, to calculate the fluid velocities and positions in the wellbore. The CFD model can use for example, a projection method or projection algorithm for the solution of the discretized Navier Stokes equations, with appropriate rheology models for the fluids, to get a time dependent velocity field in the casing. The any suitable projection method can be used in combination with the CFD model with the aid of the present disclosure. An example of a projection method suitable for use with the present disclosure can be found within Chorin, A. J. (1967), "The numerical solution of the Navier-Stokes equations for an incompressible fluid" (PDF), Bull. Am. Math. Soc., 73 (6): 928-931, doi: 10.1090/S0002-9904-1967-11853-6, incorporated by reference herein in its entirety.

The design simulator can determine a value of the mixing of wellbore fluids adjacent to the wiper plug 230. The design simulator can utilize a scalar transport solution within the upper transport cell and lower transport cell to isolate the wellbore fluids on each side of the wiper plug 230. For example, the design simulator can utilize the scalar transport solution to limit the wellbore fluids within the upper transport cell fraction, e.g., the fluid 44, from crossing the wiper plug 230 to the lower transport cell fraction. Likewise, the design simulator can utilize the scalar transport solution to limit the wellbore fluids within the lower transport cell fraction, e.g., cement slurry 34, from crossing the wiper plug 230 to the upper transport cell fraction. This limiting of the wellbore fluids from crossing the plug boundary, e.g., wiper plug 230, can be achieved via altering the incoming convective fluxes of the wellbore fluids within the lower transport cell and the outgoing convective fluxes of the upper transport cell in the solution of the scalar transport equations.

Figure 3A:
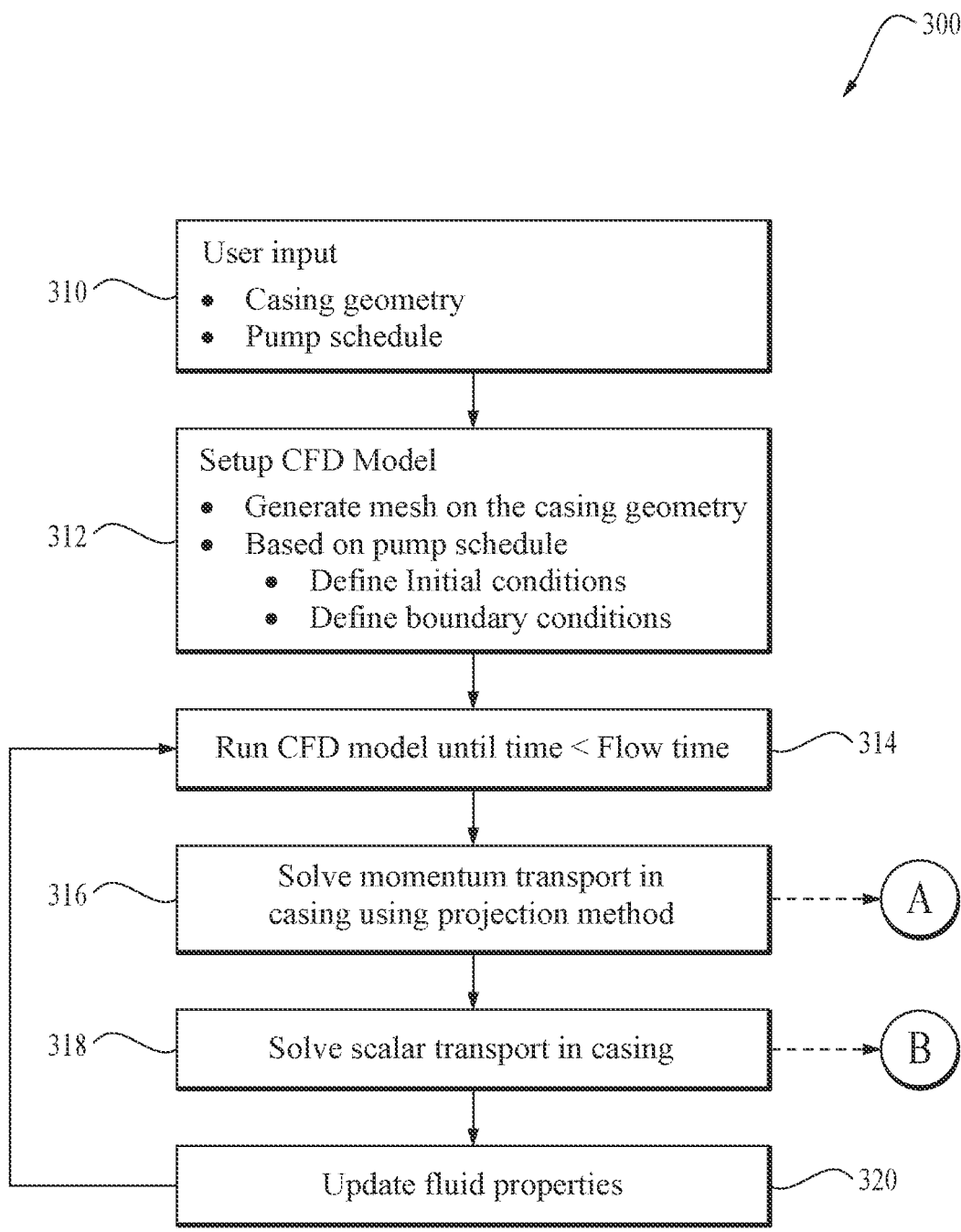
FIG. 3A-C shows a logical block diagram of a method according to an embodiment of the disclosure.

Turning now to FIG. 3A, a method of simulating a cementing plug within a wellbore utilizing a two dimensional mesh is illustrated as a logic block diagram. In some embodiments, a method 300 of modeling the movement of wellbore fluids separated by at least one cementing plug can utilize a CFD model with a static 2D mesh as illustrated in FIGS. 2A and 2B.

At block 310, a design process can utilize a CFD model executing on a computer system. The CFD model can retrieve a set of model inputs from a database. The set of model inputs comprises a wellbore geometry, a wellbore environment, a set of treatment fluids, and a pump schedule. The wellbore geometry comprises a wellbore diameter, wellbore measured depth, a casing size, a casing measured length, and an inventory of downhole equipment. The wellbore environment comprises the wellbore fluid, e.g., drilling fluid, a hydrostatic wellbore pressure, a formation pressure, a formation temperature, and a formation pore pressure. The set of treatment fluids can comprise spacer fluid type, spacer fluid volume, wellbore treatment type, e.g., cement slurry, wellbore treatment volume, and any other fluid specified within the pumping schedule. The wellbore treatment type can comprise a cement slurry, a fracturing fluid, a proppant slurry, an acid treatment, a fluid loss treatment, or any similar wellbore treatment fluid. The pump schedule can be a sequential set of instructions for mixing and pumping the wellbore treatment into the wellbore. In some embodiments, a user, e.g., service personnel, can input the set of model inputs into the design process.

At block 312, the design process, using a CFD model, can generate a static mesh within the casing geometry. As previously described in FIGS. 2A and 2B, the static mesh comprises at least two transport cells and at least two sub-cells within each of the transport cells. The CFD model can divide the linear length of the casing 20 into transport cells with a linear length measured along the longitudinal axis of the casing 20. Each transport cell, e.g., transport cell 218, can share a boundary face 210 with a subsequent transport cell, e.g., 220. The transport cells can be equal in size bounded by the inner surface 38 of the casing 20, an upper boundary face (e.g., face 210A), and a lower boundary face (e.g., face 210B). The transport cells can be sequentially placed from the beginning of the casing string, e.g., the wellhead, to the end of the casing string, e.g., the float shoe 26. The CFD model can determine initial conditions of each cell within the static mesh based on the set of model inputs, e.g., the wellbore environment. The CFD model can determine boundary conditions for each transport cell within the static mesh. For example, the first transport cell that shares an upper boundary face with the wellhead can be fluidically connected to the pump unit 52 via the wellhead 50. Although the design process describes generating a static mesh within a casing geometry with the CFD model, it is understood that the static mesh can be generated within any wellbore tubular, for example, a string of oilfield tubulars.

At block 314, the design process can execute the CFD model to step through each stage of the pump schedule. For example, a first stage may include pumping a spacer fluid into the casing 20 to displace the wellbore fluids, e.g., drilling mud, within the casing 20 while taking returns from the annular space 42 via the wellhead 50. A second stage may include releasing a lower wiper plug 24 into the casing 20 followed by a volume of cement slurry 34. A third stage may include releasing an upper wiper plug 36 after a predetermined volume of cement slurry 34 has been pumped into the casing 20 followed by an upper wiper plug 36. A volume of spacer fluid 44, e.g., wellbore fluid, may be pumped after the wiper plug 36 to displace the wiper plug 36 through the casing 20. The CFD model can model each stage of the pump schedule to determine the drilling mud displacement and/or the placement of the cement slurry.

Figure 3B:
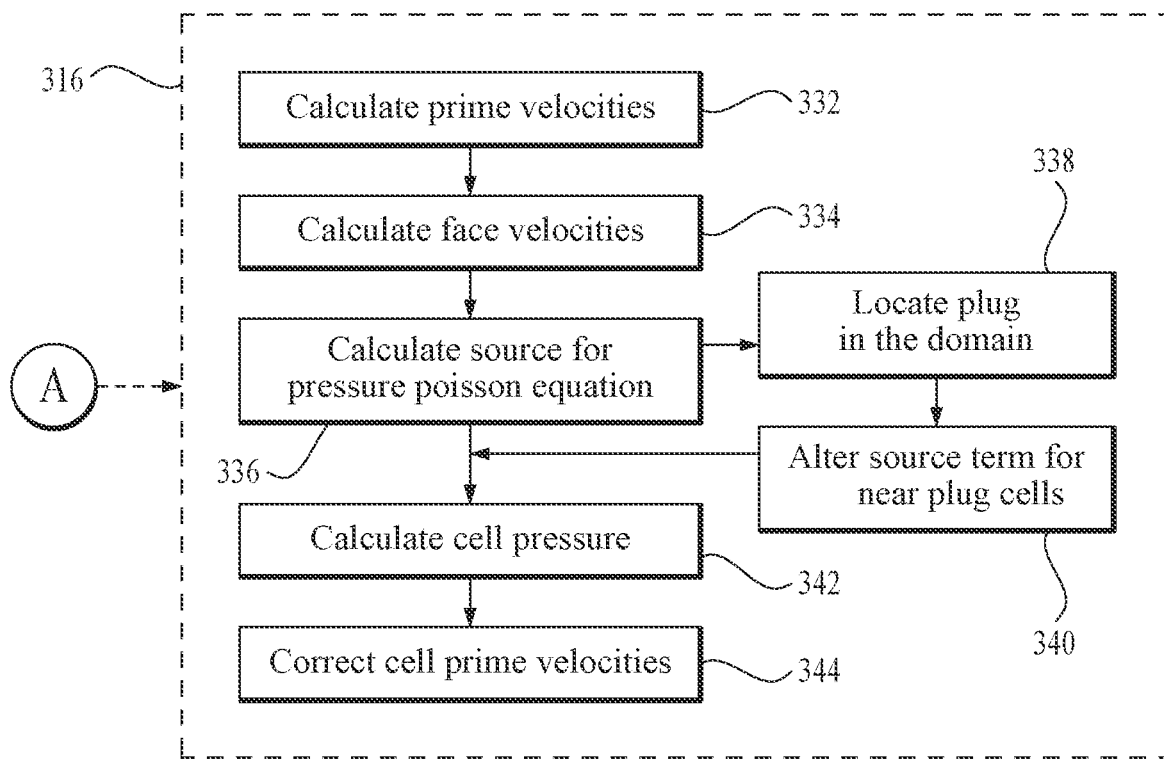

At block 316, during the simulation of each stage of the pump schedule, the CFD model can solve the momentum transport of the fluids within the casing string using a projection method as described herein. Turning now to FIG. 3B, the CFD model solve the momentum transport of the fluids with the following blocks. At block 332, the CFD model can calculate the prime velocities of the fluids within the transport cells and sub-cells via the numerical solution of the Navier-Stokes equations (Equation 1), from which the pressure gradient forcing term is dropped, as per the projection method. The numerical solution can be arrived upon using, but not limited to, numerical techniques such as Finite difference or Finite volume or Finite element methods. Below is an example equation that may be used in determining the prime velocities within, for example, the static mesh of FIGS. 2A and 2B:

$$\frac{u' - u^n}{\Delta t} = \frac{\mu_{app}}{\rho} \nabla^2 u^n - (u^n \cdot \nabla) u^n \qquad \text{Equation 1}$$

At block 334, the CFD model can calculate the face velocities of the fluids within the static mesh transport cells. The solution of equation 1 above, can yield a velocity that is present at the centers of these transport cells. The velocities from the cell center locations can be interpolated to the center of the cell face. The flux of the transported quantities across the cell face can be determined with interpolated velocities at the center of the cell face. Below is an example equation that may be used in determining the face velocities within, for example, the static mesh of FIG. 2A. The velocity on boundary face 210B for sub cell A can be found by interpolating cell center velocity of sub-cell 222A and 220B, using equation 2a. The flux across the cell face can then be calculated using the equation 2b:

$$(u')_{face\_210B} = \frac{\left((u')_{cell-222A} + (u')_{cell-220A}\right)}{2} \qquad \text{Equation 2a}$$

$$\text{Flux}_{face\_210B} = (u')_{face} * A_{face} * \rho_{fluid} \qquad \text{Equation 2b}$$

At block 336, the CFD model can calculate the source for pressure Poisson equation within the transport cells and sub-cells. The pressure field within the static mesh can be determined by solving the pressure Poisson equation 3. The flux imbalance in each cell can be calculated from the prime velocities obtained from the solution of Equation 1. The flux imbalance in each cell can be a source for the pressure Poisson Equation 5 as will be described further hereinafter. Below is an example equation that may be used in determining the source for pressure Poisson equation within, for example, the static mesh of FIGS. 2A and 2B:

$$\text{Flux imbalance in each cell} = \left(\nabla \cdot \vec{u}'\right) = \text{Flux}_{in} - \text{Flux}_{out} \quad \text{Equation 3}$$

At block 338, the CFD model can determine if a wiper plug 230, e.g., wiper plug 36, is within the static mesh and determine the location of the wiper plug 230 as previously described. For example, the design simulator can determine the location of the wiper plug 230, based on the volume of the fluid pumped, the pump rate from the pump schedule, and the pumping time. Once the fluid volume has been estimated, it can be mapped to the meshed domain, by calculating how many static mesh cells would be required starting from the inlet of the casing to hold that fluid volume. The location and/or the cell number where the plug is located can be determined for a value of time, a value of volume, or both. The corresponding cell can be split into the upper transport cell fraction and the lower transport cell fraction, to match the exact fluid volume pumped.

At block 340, the CFD model can then alter the source term for pressure Poisson, equation 3, for the upper transport cell fraction and the lower transport cell fraction, e.g., transport cell fraction 222', by setting the momentum flux crossing the lower face of cell 220' and upper face of cell 222' using the velocity of the plug as given in Equation 4. Below is an example equation that may be defined by the upper transport cell fraction as shown in FIG. 2B:

$$\text{Flux}_{face\_220'A} = \left(\vec{u}'\right)_{plug} * A_{face} * \rho_{fluid} \quad \text{Equation 4}$$

At block 342, the CFD model can calculate the cell pressure within the transport cells and sub-cells. The pressure field in the static mesh can be solved for using the source Poisson term calculated in Equation 3 and Equation 4. Below is an example equation that may be used in determining the cell pressure within, for example, the static mesh of FIGS. 2A and 2B:

$$\nabla \cdot \nabla p^{n+1} = \frac{\rho}{\Delta t}\left(\nabla \cdot \vec{u}'\right) \quad \text{Equation 5}$$

At block 344, the CFD model can correct the cell prime velocities. The CFD model can utilize the projection algorithm with the pressure field of Equation 5 and the solution of the Equation 6 to correct the prime velocities obtained from Equation 1, to obtain the actual final velocity field at any given time step.

$$u^{n+1} = \vec{u}' - \frac{\Delta t}{\rho}\nabla p^{n+1} \quad \text{Equation 6}$$

Figure 3C:
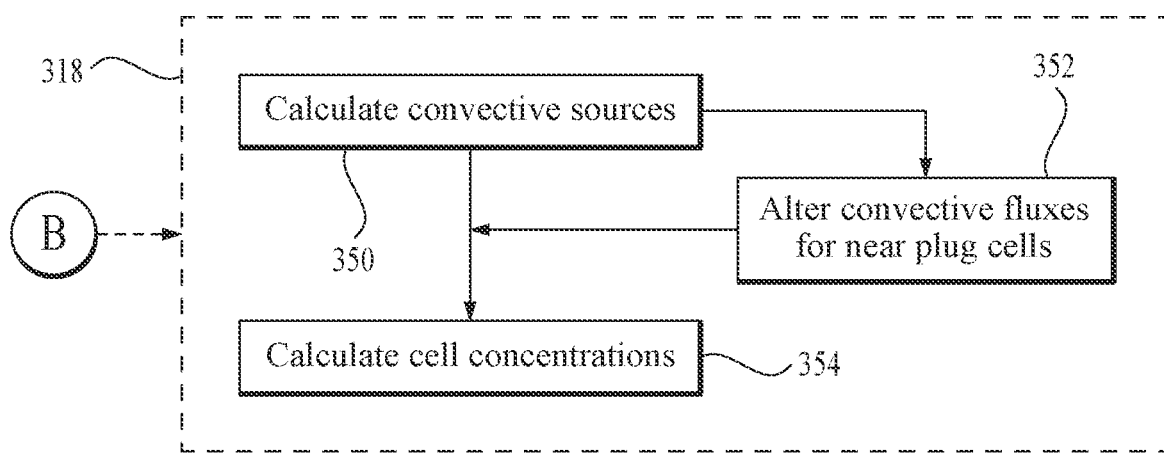

Returning now to FIG. 3A, the block 318, during the simulation of each stage of the pump schedule, the CFD model can solve the scalar transport of the fluids within the casing string adjacent to the wiper plug 36. Turning now to FIG. 3C, the CFD model can determine the convective sources and solve the convective fluxes adjacent to the wiper plug 230. At block 350, the CFD model can determine the convective sources within the transport cells and sub-cells.

At block 352, the CFD model can alter the convective fluxes for the cells which are adjacent to the plug, to ensure the fluids do not cross the plug face and stay physically separated by setting the convective fluxes of cell concentration to zero at specific cell faces. For example, for the fluid above the wiper plug 230, the exit flux of the upper cell fraction and the incoming flux for the lower cell fraction are both explicitly set to zero.

At block 354, the CFD model can determine the cell concentrations within the upper transport cell fraction, lower transport cell fraction, and the sub-cells by the solution(s) of equations of the form given by Equation 7 (e.g., the scalar transport equation) which track the concentration of the fluids in the wellbore. The CFD model can solve (n−1) equations for n fluids in the system. Below is an example equation that may be used to determine the cell concentrations within, for example, the static mesh of FIGS. 2A and 2B:

$$\frac{\partial c_i}{\partial t} + (u \cdot \nabla)c_i = D \cdot \nabla^2 c_i \quad \text{Equation 7}$$

Returning now to FIG. 3A, at block 320, during the simulation of each stage of the pump schedule, the CFD model can update the fluid properties within each of the static cells within the mesh, as shown in FIGS. 2A and 2B, by updating the fluid properties in the static mesh cells, based on the fluid (or fluid mixture) that is occupying each cell. In case of a fluid mixture, the fluid properties can be determined by a concentration weighted average.

The CFD model can return to block 314 from block 320 to update each stage per a value of time or per a value of volume of fluid pumped. The CFD model can determine if all stages and/or volume of fluid is complete.

In some embodiments, the CFD model can determine the concentration of a wellbore treatment fluid that is separated from the wellbore fluids by a physical barrier, e.g., wiper plug, traveling within an oilfield tubular. The concentration of the wellbore treatment when the physical barrier reaches a target depth, e.g., a float shoe, can be determined by a design process that comprises the CFD model. The design process comprises retrieving a set of model inputs that may comprise the geometry of the wellbore tubular, the wellbore fluid properties, the wellbore treatment fluid properties, the wellbore environment, the wellbore path, or combinations thereof. The design process can include a CFD model that generates a static mesh representative of the oilfield tubular extending into a wellbore. The oilfield tubular can include one or more target depths and one or more downhole tools, e.g., cementing equipment, at the one or more target depths. The CFD model can located the geometric representation of the physical barrier, e.g., wiper plug, within the static mesh by correlating the pump schedule, a time value, a volume of fluid pumped, a pumping rate, or combination thereof to an axial measurement of the physical barrier within the oilfield tubular and the static cell number within the static mesh. The CFD model can transform an upper static mesh cell and a lower static mesh cell into an upper mesh cell fraction and a lower mesh cell fraction in response to the location of the physical barrier, e.g., the mesh cell number, determining that the physical barrier is entering the upper static mesh cell. The CFD model can determine a fluid velocity within the upper mesh cell fraction and lower mesh cell fraction. The fluid velocity can be determined as a function of the velocity of the physical barrier. The CFD model can utilize the projection algorithm with the pressure field of Equation 5 and the solution of the Equation 6 to correct the prime velocities obtained from Equation 1, to obtain the actual final velocity field within the upper mesh cell fraction at any given time step. The CFD model can set the fluid velocity within the lower mesh cell fraction to the same as the upper mesh cell fraction. The CFD model can determine a convective fluxes of the fluid within the upper mesh cell fraction and the lower mesh cell fraction in response to the determination of the fluid velocity. The CFD model can determine the concentration of a wellbore treatment fluid within the upper transport cell fraction and sub-cells, the lower transport cell fraction and sub-cells, or both, by the solution(s) of equations of the form given by Equation 6 (e.g., the scalar transport equation) which track the concentration of the fluids in the wellbore. The design process can predict the concentration of a wellbore treatment fluid at a value of time or a value of volume with a CFD model solving for the concentration of a wellbore treatment fluid in response to the physical barrier reaching a target location within the wellbore tubular. A pump schedule can be generated in response to the concentration of the wellbore treatment fluid being above a threshold value. The wellbore treatment can be pumped into the wellbore per the pump schedule generated by the design process.

In some embodiments, a wellbore at a wellsite can be treated with a pumping operation. The service personnel may transport the wellbore treatment, a pumping procedure, and the pumping equipment, e.g., pump unit 52 of FIG. 1, to the wellsite. The wellbore treatment can be designed by the design process utilizing the CFD model. The wellbore treatment can comprise a volume of dry ingredients, a volume of chemicals, and various additives that are combined with a liquid, e.g., water, to produce the desired wellbore treatment fluid. In some embodiments, the service personnel can fluidically couple the pumping equipment to the wellbore. The wellbore treatment can be mixed from the volume of dry ingredients, various chemicals, and water and pumped into the wellbore per the pumping procedure.

In some embodiments, the service personnel may identify a deviation or a change to the set of model inputs used to generate the wellbore treatment and pump schedule. For example, the wellbore geometry may have changed, e.g., the measured depth has been reduced or extended. In another scenario, properties of the liquid, e.g., water, may have changed. For example, the water may have a higher salt content than the design used in the simulations. The service personnel may communicate the deviation to the set of inputs to a remote computer, e.g., a service personnel at a service center, for simulation with the CFD model. The service personnel may use a wireless communication method, e.g., a mobile communication service.

In some embodiments, the service center personnel may utilize the previously described design process with the CFD model on a remote computer to simulate the fluid flow within the wellbore with the revised set of inputs. The service center personnel can communicate (with a wireless communication method) a modified wellbore treatment and/or modified pump schedule to the service personnel at the wellsite.

In some embodiments, the service personnel at the wellsite can utilize the previously described design process with the CFD model on a computer system at the wellsite, for example, with the unit controller 60 on the pump unit 52. The design process and CFD model can execute on the processor of the unit controller 60. The service personnel can input the modified set of inputs into the CFD model executing on the unit controller 60 to determine if any changes are needed to the wellbore treatment and/or the pump schedule. The design process can output a modified wellbore treatment and a modified pump schedule. The service personnel can communicate the changes to the set of model inputs, the wellbore treatments, and the pump schedule to the remote computer of the service center.

In some embodiments, service personnel at the wellsite can couple the pumping equipment to a wellbore via a wellhead, wherein the pumping equipment is fluidically connected to the wellbore. The pumping equipment can comprise a unit controller, a mixing equipment, and a pumping mechanism. A wellbore servicing operation, for example, a cementing operation can comprise the mixing and the pumping of the well bore treatment per the pump schedule.

The unit controller can begin the cementing operation by controlling the mixing equipment and pumping equipment per the pump schedule. The unit controller can retrieve one or more datasets of periodic pumping data indicative of the pumping operation. The unit controller can mix a wellbore treatment, e.g., a cement slurry, comprising a wellbore treatment blend per the pump schedule. The wellbore treatment blend can be designed by the design process and the pumping operation simulated with the CFD model.

The modified wellbore treatment can be pumped into the wellbore per the modified pump schedule.

Figure 4:
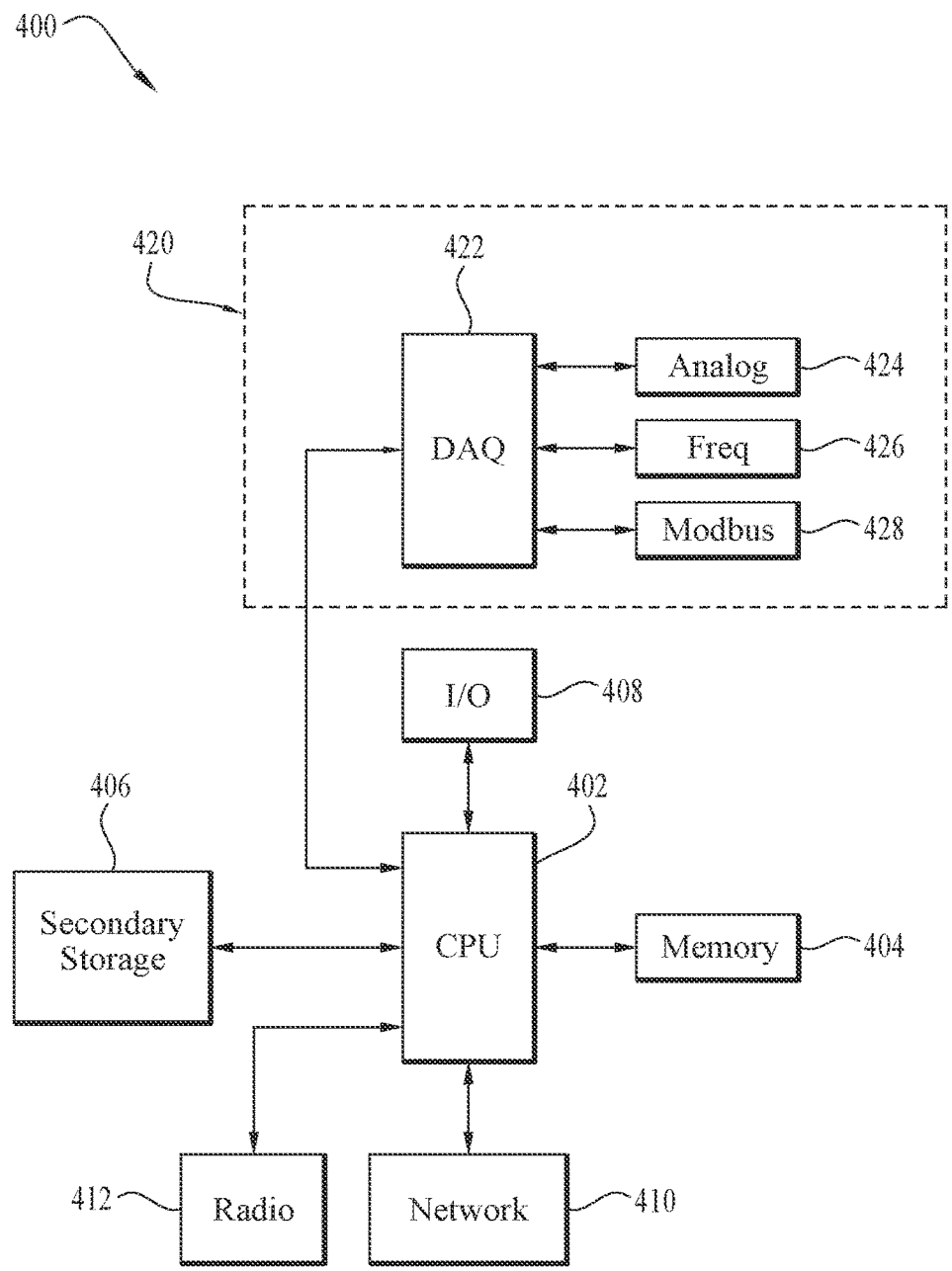
FIG. 4 is a block diagram of a computer system suitable for implementing one or more embodiments of the disclosure.

The computer system at the wellsite site may be a computer system suitable for communication and control of the well treatment operation including pumping equipment via a unit controller. In some embodiments, the unit controller 60 of the pumping equipment, e.g., pump unit 52, of FIG. 1 may be an exemplary computer system 400 described in FIG. 4. The computer system located at a remote location may be a computer system suitable for communication and analysis of the design of the pump schedule and the pumping operation. For example, in FIG. 2, the design process 200 can be performed on computer system with the CFD model executing on the same computer system, a networked computer system, or combinations thereof. The CFD model can be executing on the same unit controller 60, a networked computer system, a remote computer system, or combinations thereof. In some embodiments, the computer system utilized at the remote location can be an exemplary computer system 400 described in FIG. 4. Turning now to FIG. 4, a computer system 400 suitable for implementing one or more embodiments of the unit controller, for example, unit controller 60 of the pump unit 52, including without limitation any aspect of the computing system associated with the pumping equipment and pumping operation located at a remote wellsite. The computer system 400 includes one or more processors 402 (which may be referred to as a central processor unit or CPU) that is in communication with memory 404, secondary storage 406, input output devices 408, and network devices 410. The computer system 400 may continuously monitor the state of the input devices and change the state of the output devices based on a plurality of programmed instructions. The programming instructions may comprise one or more applications retrieved from memory 404 for executing by the processor 402 in non-transitory memory within memory 404. The input output devices may comprise a Human Machine Interface with a display screen and the ability to receive conventional inputs from the service personnel such as push button, touch screen, keyboard, mouse, or any other such device or element that a service personnel may utilize to input a command to the computer system 400. The secondary storage 406 may comprise a solid state memory, a hard drive, or any other type of memory suitable for data storage. The secondary storage 406 may comprise removable memory storage devices such as solid state memory or removable memory media such as magnetic media and optical media, i.e., CD disks. The computer system 400 can communicate with various networks with the network devices 410 comprising wired networks, e.g., Ethernet or fiber optic communication, and short range wireless networks such as Wi-Fi (i.e., IEEE 802.11), Bluetooth, or other low power wireless signals such as ZigBee, Z-Wave, 6LoW-Pan, Thread, and WiFi-ah. The computer system 400 may include a long range radio transceiver 412 for communicating with mobile network providers.

In some embodiments, the computer system 400 may comprise a DAQ card 414 for communication with one or more sensors. The DAQ card 414 may be a standalone system with a microprocessor, memory, and one or more applications executing in memory. The DAQ card 414, as illustrated, may be a card or a device within the computer system 400. In some embodiments, the DAQ card 414 may be combined with the input output device 408. The DAQ card 414 may receive one or more analog inputs 416, one or more frequency inputs 418, and one or more Modbus inputs 420. For example, the analog input 416 may include a volume sensor, e.g., a tank level sensor. For example, the frequency input 418 may include a flow meter, i.e., a fluid system flowrate sensor. For example, the Modbus input 420 may include a pressure transducer. The DAQ card 414 may convert the signals received via the analog input 416, the frequency input 418, and the Modbus input 420 into the corresponding sensor data. For example, the DAQ card 414 may convert a frequency input 418 from the flowrate sensor into flow rate data measured in gallons per minute.

Additional Disclosure

The following is provided as additional disclosure for combinations of features and aspects of the present invention.

A first embodiment, which is a wellbore servicing method comprising transporting a pump unit to a wellsite having a wellbore penetrating a subterranean formation, wherein the pump unit comprises a unit controller configured to control pumping equipment to pump a treatment fluid into the wellbore, wherein the unit controller comprises a processor and a non-transitory memory; executing a design process on the unit controller, wherein the design process is configured to: generate, by a computational fluid dynamics (CFD) model, a static mesh representative of a geometry of an oilfield tubular disposed within a wellbore; determine, by the CFD model, a location of a geometric representation of a wiper plug within the static mesh; transform, by the CFD model, a portion of the static mesh into at least two flexible mesh cells in response to the geometric representation of the wiper plug entering the portion of the static mesh; and generate, by the CFD model, a predicted concentration of the treatment fluid in response to the geometric representation of the wiper plug reaching a target location within the static mesh; and generating, by the design process, a working pump schedule for pumping one or more volumes of the treatment fluid into the wellbore in response to the predicted concentration exceeding a threshold value at the target location; and controlling, by the unit controller, the pumping equipment to pump the treatment fluid into the wellbore in in accordance with the working pump schedule received from the design process.

A second embodiment, which the method of the first embodiment, further comprising retrieving, by the design process, a set of model inputs for the CFD model.

A third embodiment, which is the method of the first or the second embodiment, wherein the set of model inputs comprise a first wellbore fluid, a treatment fluid, and a design pump schedule.

A fourth embodiment, which is the method of the first through the third embodiments, wherein the design process further comprises model, by the CFD model, a pumping operation comprising a first wellbore fluid in accordance with a design pump schedule within the static mesh of the oilfield tubular; and wherein the first wellbore fluid is a cement slurry, a spacer fluid, a fracturing fluid, an acidizing fluid, a drilling fluid, or a completion fluid.

A fifth embodiment, which is the method of any of the first through the fourth embodiments, wherein the design process further comprises: model, by the CFD model, a pumping operation comprising an introduction of the geometric representation of the wiper plug in accordance with a design pump schedule within the static mesh of the oilfield tubular; model, by the CFD Model, a pumping operation comprising the pumping of a treatment fluid in accordance with the design pump schedule within the static mesh; and wherein the geometric representation of the wiper plug is configured to separate a first wellbore fluid from the treatment fluid.

A sixth embodiment, which is the method of any of the first through the fifth embodiments, wherein the at least two flexible mesh cells comprises an upper static mesh cell and a lower static mesh cell, wherein the upper static mesh cell is above a geometric representation of the wiper plug, wherein the lower static mesh cell is below the geometric representation of the wiper plug; and wherein the at least two flexible mesh cells comprise an upper mesh cell fraction and a lower mesh cell fraction in response to the wiper plug entering the upper static mesh cell.

A seventh embodiment, which is the method of any of the first through the sixth embodiments, wherein the location of the wiper plug within the static mesh is determined as a function of a volume of fluid pumped after introduction of the wiper plug, wherein the volume of fluid pumped is a function of a design pump schedule, a pump rate of the pumping equipment, a period of time, or combinations thereof.

An eighth embodiment, which is the method of any of the first through the seventh embodiments, wherein the treatment fluid is a cement slurry, a spacer fluid, a fracturing fluid, an acidizing fluid, a drilling fluid, or a completion fluid.

A ninth embodiment, which is a computer-implemented method of determining a concentration of a wellbore treatment fluid at a physical barrier traveling within an oilfield tubular disposed in a wellbore penetrating a subterranean formation, the method comprising: retrieving a set of model inputs; generating, by a computational fluid dynamics (CFD) model based on the set of model inputs, a static mesh representative of the oilfield tubular extending into a wellbore; determining, by the CFD model, a location of a physical barrier within the static mesh relative to an upper static mesh cell and a lower static mesh cell within the static mesh; responsive to determining the location of the physical barrier, transforming the upper static mesh cell and the lower static mesh cell into an upper mesh cell fraction and a lower mesh cell fraction in response to the physical barrier entering the upper static mesh cell, and wherein the lower mesh cell fraction combines the lower static mesh cell with a portion of the upper static mesh cell; determining, by the CFD model, a fluid velocity within the upper mesh cell fraction and the lower mesh cell fraction, wherein the fluid velocity represents a velocity of a treatment fluid moving in the oilfield tubular; determining, by the CFD model, one or more convective fluxes of the treatment fluid within the upper mesh cell fraction and the lower mesh cell fraction in response to the determination of the fluid velocity; determining, by the CFD model, the concentration of the wellbore treatment fluid within the upper mesh cell fraction, the lower mesh cell fraction, or both in response to determining the convective fluxes; and predicting, by the CFD model, the concentration of a wellbore treatment fluid in response to the location of the physical barrier reaching a target mesh cell within the static mesh.

A tenth embodiment, which is a method of the ninth embodiment, wherein the set of model inputs comprise a geometry of the wellbore, a wellbore environment, at least one treatment fluid, at least one wellbore fluid, a design pump schedule, or combinations thereof.

An eleventh embodiment, which is the method of the ninth or the tenth embodiment, wherein the geometry of the wellbore comprises a wellbore path, an oilfield tubular diameter, an oilfield tubular length, an inventory of downhole equipment, or combinations thereof, wherein the wellbore path comprises a wellbore diameter and a wellbore depth along a wellbore trajectory; wherein the wellbore environment comprises a wellbore pressure, a wellbore temperature, a formation pressure, a formation temperature, or combinations thereof; wherein the at least one treatment fluid includes a drilling fluid, a spacer fluid type, a spacer fluid volume, a cementitious fluid, a fracturing fluid, an acidizing fluid, a completion fluid, or combinations thereof; wherein the wellbore treatment fluid can comprise a cement slurry, a fracturing fluid, a proppant slurry, an acid treatment, a fluid loss treatment, or any combination thereof; and wherein the design pump schedule can be a sequential set of instructions for mixing and pumping the wellbore treatment fluid into the wellbore.

A twelfth embodiment, which is the method of the ninth embodiment, wherein generating the static mesh comprises dividing the oilfield tubular along a length of a longitudinal axis into at least two static mesh cells, wherein each of the static mesh cells are bounded by an inner surface of the wellbore tubular, an upper boundary face, and a lower boundary face, and wherein the at least two static mesh cells are sequential and share a boundary face.

A thirteenth embodiment, which is the method of the twelfth embodiment, wherein generating the static mesh further comprises dividing each of the at least two static mesh cells into at least two sub-cells, wherein the division is parallel to the longitudinal axis, and wherein each of the sub-cells are about equal in size.

A fourteenth embodiment, which is the method of any of the ninth through the thirteenth embodiments, wherein determining the location the physical barrier comprises determining a static mesh cell that the physical barrier has entered as a function of a volume of fluid pumped after release of the physical barrier, wherein the volume of fluid pumped is a function of a pump schedule, a pump rate of a pumping equipment, a period of time, or combinations thereof.

A fifteenth embodiment, which is the method of any of the ninth through the fourteenth embodiments, wherein the physical barrier comprises a cementing plug, a wiper plug, a dart, a ball, and wherein the physical barrier is configured to sealingly engage an inner surface of a wellbore tubular.

A sixteenth embodiment, which is the method of any of the ninth through the fifteenth embodiments, wherein the fluid velocity is determined by a projection algorithm; wherein the one or more convective fluxes further comprise an exit flux of the upper cell fraction and an incoming flux for the lower cell fraction to zero; and wherein the concentration within the upper mesh cell fraction, the lower cell fraction, or both is determined with a scalar transport equation.

A seventeenth embodiment, which is the method of any of the ninth through the sixteenth embodiments, further comprising transporting at least one treatment fluid and a pumping equipment to a wellsite; fluidically coupling the pumping equipment to a wellbore; mixing, by the pumping equipment, the treatment fluid; releasing the physical barrier into the oilfield tubular; pumping the at least one treatment fluid into the wellbore; and wherein the mixing, the releasing, the pumping, or combinations thereof are in accordance with a pump schedule.

An eighteenth embodiment, which is a system of a wellbore pump unit, comprising: a wellbore pump unit comprising a pumping equipment; a unit controller comprising a processor, a non-transitory memory, and a design process executing in memory, configured to: retrieve, by the design process, a current set of model inputs from a set of drilling data located at a wellsite; determine, by the design process, a change in the set of model inputs by comparing the current set of model inputs to a design set of model inputs; generate, by a computational fluid dynamics (CFD) model, a static mesh with a flexible mesh portion within a geometry representative of an oilfield tubular extending into a wellbore; generate, by the CFD model, a geometric representation of a movable physical barrier within the static mesh; determine, by the CFD model, a predicted concentration of a wellbore treatment fluid at the location of the physical barrier within the static mesh; generate, by the CFD model, the predicted concentration of the wellbore treatment fluid in response to the a geometric representation of the physical barrier reaching a target location within the static mesh; and generate, by the design process, a modified wellbore treatment fluid, a modified pump schedule, or both in response to the predicted concentration of the wellbore treatment exceeding a threshold value.

A nineteenth embodiment, which is the system of the eighteenth embodiment, wherein the design process is further configured to: control, by the design process, a pumping operation configured to place a wellbore treatment fluid at the target location within the wellbore.

A twentieth embodiment, which is the system of the eighteenth or the nineteenth embodiment, further comprising determine, by the CFD model, the location of the physical barrier within the static mesh, wherein the location within the static mesh comprises a transport cell that the movable physical barrier has entered as a function of a volume of fluid pumped after release of the movable physical barrier, wherein the volume of fluid pumped is a function of a design pump schedule, a pump rate of the pumping equipment, a period of time, or combinations thereof; create, by the CFD model, the flexible mesh portion of the static mesh at the location of the physical barrier; and wherein the flexible mesh portion comprises an upper mesh cell fraction and a lower mesh cell fraction, wherein the upper mesh cell fraction shares a boundary with the physical barrier.

A twenty-first embodiment, which is the system of any of the eighteenth through the twentieth embodiments, wherein determine a predicted concentration of a wellbore treatment fluid comprises: determine, by the CFD model, a velocity of the geometric representation of the movable physical barrier within the static mesh of the wellbore tubular; determine, by the CFD model, a fluid velocity within an upper mesh cell fraction and a lower mesh cell fraction, wherein the fluid velocity within the upper mesh cell fraction and the lower mesh cell fraction is determined by the CFD model with a projection algorithm; determine, by the CFD model, a convective flux of the fluid within the upper mesh cell fraction and the lower mesh cell fraction in response to the determination of the fluid velocities, wherein the convective flux within the upper mesh cell fraction and the lower mesh cell fraction are determined by a scalar transport equation; and determine, by the CFD model, the predicted concentration of the wellbore treatment fluid within the upper mesh cell fraction, the lower mesh cell fraction, or both in response to determining the convective fluxes.

A twenty-second embodiment, which is the system of any of the eighteenth through the twenty-first embodiments, wherein the pump unit is a cementing pump, a fracturing pump, a mud pump, or a blender.

While embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, Rl, and an upper limit, Ru, is disclosed, any number falling within the range is specifically disclosed. In particular, the following numbers within the range are specifically disclosed: R=Rl+k*(Ru−Rl), wherein k is a variable ranging from 1 percent to 100 percent with a 1 percent increment, i.e., k is 1 percent, 2 percent, 3 percent, 4 percent, 5 percent, 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the embodiments of the present invention. The discussion of a reference in the Detailed Description of the Embodiments is not an admission that it is prior art to the present invention, especially any reference that may have a publication date after the priority date of this application. The disclosures of all patents, patent applications, and publications cited herein are hereby incorporated by reference, to the extent that they provide exemplary, procedural or other details supplementary to those set forth herein.

What is claimed is:

1. A wellbore servicing method comprising:
    transporting a pump unit to a wellsite having a wellbore penetrating a subterranean formation, wherein the pump unit comprises a unit controller configured to control pumping equipment to pump a treatment fluid into the wellbore, and wherein the unit controller comprises a processor and a memory;
    executing, by the unit controller, a design process is comprising:
        generating, using a computational fluid dynamics (CFD) model, a static mesh representative of a geometry of an oilfield tubular disposed within the wellbore, wherein the model receives inputs from a set of drilling data from the wellsite;
        determining, using the CFD model, a location of a geometric representation of a wiper plug within the static mesh;
        transforming, using the CFD model, a portion of the static mesh into flexible mesh cells in response to the geometric representation of the wiper plug entering the portion of the static mesh; and
        generating, using the CFD model, a predicted concentration of the treatment fluid in response to the geometric representation of the wiper plug reaching a target location within the static mesh;
    generating, by the unit controller, based on a result of the design process, a working pump schedule for pumping one or more volumes of the treatment fluid into the wellbore in response to the predicted concentration exceeding a threshold value at the target location; and
    controlling, by the unit controller, the pumping equipment to pump the treatment fluid into the wellbore in accordance with the working pump schedule.

2. The method of claim 1, further comprising retrieving, by the unit controller, the set of drilling data.

3. The method of claim 2, wherein the set of drilling data comprises a first wellbore fluid, the treatment fluid, and a design pump schedule.

4. The method of claim 1, wherein the design process further comprises modeling, using the CFD model, a pumping operation comprising pumping a first wellbore fluid in accordance with a design pump schedule within the static mesh.

5. The method of claim 4, wherein the first wellbore fluid comprises a cement slurry, a spacer fluid, a fracturing fluid, an acidizing fluid, a drilling fluid, or a completion fluid.

6. The method of claim 1, wherein the design process further comprises modeling, using the CFD model, a pumping operation by introducing the geometric representation of the wiper plug in accordance with a design pump schedule within the static mesh.

7. The method of claim 6, wherein the design process further comprises modeling, by the CFD Model, a pumping operation comprising pumping the treatment fluid in accordance with the design pump schedule within the static mesh.

8. The method of claim 7, wherein the geometric representation of the wiper plug separates a first wellbore fluid from the treatment fluid.

9. The method of claim 1, wherein the flexible mesh cells comprise an upper static mesh cell and a lower static mesh cell, wherein the upper static mesh cell is above the geometric representation of the wiper plug, and wherein the lower static mesh cell is below the geometric representation of the wiper plug.

10. The method of claim 9, wherein the flexible mesh cells further comprise an upper mesh cell fraction and a lower mesh cell fraction in response to the wiper plug entering the upper static mesh cell.

11. The method of claim 1, wherein a location of the wiper plug within the static mesh is determined as a function of a volume of fluid pumped after introduction of the wiper plug, and wherein the volume of fluid pumped is a function of a design pump schedule, a pump rate of the pumping equipment, a period of time, or combinations thereof.

12. The method of claim 1, wherein the treatment fluid is comprises a cement slurry, a spacer fluid, a fracturing fluid, an acidizing fluid, a drilling fluid, or a completion fluid.

13. A system comprising:
a wellbore pump unit comprising a pumping equipment; and
a unit controller comprising a processor and a memory, wherein the unit controller is configured to execute a design process comprising:
retrieving a current set of inputs from a set of drilling data located at a wellsite having a wellbore;
comparing the current set of inputs to a design set of model inputs;
inputting the current set of inputs into a computational fluid dynamics (CFD) model;
generating, by the CFD model, a static mesh with a flexible mesh portion within a geometric representation of an oilfield tubular extending into the wellbore;
generating, by the CFD model, a geometric representation of a movable physical barrier within the static mesh;
determining, by the CFD model, a predicted concentration of a wellbore treatment fluid at a location of the movable physical barrier within the static mesh;
generating the predicted concentration of the wellbore treatment fluid in response to the geometric representation of the movable physical barrier reaching a target location within the static mesh; and
generating a modified wellbore treatment fluid, a modified pump schedule, or both in response to the predicted concentration of the wellbore treatment fluid exceeding a threshold value.

14. The system of claim 13, wherein the unit controller is further configured to control, based on a result of the design process, a pumping operation to place the wellbore treatment fluid at the target location within the wellbore.

15. The system of claim 13, wherein the unit controller is further configured to determine, using the CFD model, the location of the movable physical barrier within the static mesh, wherein the location of the movable physical barrier within the static mesh comprises a transport cell that the movable physical barrier has entered as a function of a volume of fluid pumped after release of the movable physical barrier, and wherein the volume of fluid pumped is a function of a design pump schedule, a pump rate of the pumping equipment, a period of time, or combinations thereof.

16. The system of claim 15, wherein the unit controller is further configured to create, using the CFD model, the flexible mesh portion at the location of the movable physical barrier.

17. The system of claim 16, wherein the flexible mesh portion comprises an upper mesh cell fraction and a lower mesh cell fraction, and wherein the upper mesh cell fraction shares a boundary with the movable physical barrier.

18. The system of claim 13, wherein the unit controller is further configured to determine the predicted concentration of the wellbore treatment fluid by determining, using the CFD model, a velocity of the geometric representation of the movable physical barrier within the static mesh.

19. The system of claim 18, wherein the unit controller is further configured to determine the predicted concentration of the wellbore treatment fluid by determining, using the CFD model, a fluid velocity within an upper mesh cell fraction and a lower mesh cell fraction, and wherein the fluid velocity is determined using a projection algorithm.

20. The system of claim 19, wherein the unit controller is further configured to determine the predicted concentration of the wellbore treatment fluid by determining, using the CFD model, a convective flux of the wellbore treatment fluid within the upper mesh cell fraction and the lower mesh cell fraction in response to the determination of the fluid velocity, and wherein the convective flux is determined using a scalar transport equation.

21. The system of claim 20, wherein the unit controller is further configured to determine the predicted concentration of the wellbore treatment fluid by determining, using the CFD model, the predicted concentration of the wellbore treatment fluid within the upper mesh cell fraction, the lower mesh cell fraction, or both in response to determining the convective flux.

22. The system of claim 13, wherein the pump unit is comprises a cementing pump, a fracturing pump, a mud pump, or a blender.

* * * * *